United States Patent
Bertakis et al.

(10) Patent No.: US 11,874,064 B2
(45) Date of Patent: Jan. 16, 2024

(54) HOOD FOR SI-METAL TAPPING

(71) Applicant: WACKER CHEMIE AG, Munich (DE)

(72) Inventors: Evangelos Bertakis, Burghausen (DE); Ronald Eulenberger, Kastl (DE); Einar Olav Schei, Kyrksaeterora (NO)

(73) Assignee: Wacker Chemie AG, Munich (DE)

( * ) Notice: Subject to any disclaimer, the term of this patent is extended or adjusted under 35 U.S.C. 154(b) by 174 days.

(21) Appl. No.: 16/639,970

(22) PCT Filed: Feb. 22, 2018

(86) PCT No.: PCT/EP2018/054384
§ 371 (c)(1),
(2) Date: Feb. 18, 2020

(87) PCT Pub. No.: WO2019/161897
PCT Pub. Date: Aug. 29, 2019

(65) Prior Publication Data
US 2020/0393198 A1 Dec. 17, 2020

(51) Int. Cl.
*F27D 17/00* (2006.01)
*C01B 33/037* (2006.01)
(Continued)

(52) U.S. Cl.
CPC .......... *F27D 17/002* (2013.01); *C01B 33/037* (2013.01); *F27D 1/1808* (2013.01);
(Continued)

(58) Field of Classification Search
None
See application file for complete search history.

(56) References Cited

U.S. PATENT DOCUMENTS

| | | | |
|---|---|---|---|
| 2,648,714 A * | 8/1953 | Williams | F27D 17/003 122/6 A |
| 3,555,163 A | 1/1971 | Lucas | |
| 3,979,551 A | 9/1976 | Overmyer et al. | |

FOREIGN PATENT DOCUMENTS

| | | |
|---|---|---|
| CA | 1056426 A | 6/1979 |
| CN | 101225452 A | 7/2008 |

(Continued)

OTHER PUBLICATIONS

Mehdi Kadkhodabeigi, Modeling of Tapping Processes in Submerged Arc Furnaces, Thesis for the degree of Philosophiae Doctor, May 2011, pp. 108-142, Norwegian University of Science and Technology, Trondheim, Norway.

(Continued)

*Primary Examiner* — Sally A Merkling
*Assistant Examiner* — Michael Forrest
(74) *Attorney, Agent, or Firm* — BROOKS KUSHMAN P.C.

(57) ABSTRACT

A hood for a taphole and a tapping spout in a submerged arc furnace in the production of silicon. The hood has at least two suction ducts which are placed asymmetrically on either side of the hood, and is useful in a process for the production of silicon in a submerged arc furnace, wherein liquid silicon and refining gas escape from a taphole of a crucible, wherein the liquid silicon flows on a tapping spout into a ladle, wherein the refining gas is sucked in a hood which has at least two suction ducts which are placed on either side of the hood.

8 Claims, 1 Drawing Sheet

(51) Int. Cl.
    *F27D 1/18*     (2006.01)
    *F27D 3/15*     (2006.01)
    *C22B 9/20*     (2006.01)
(52) U.S. Cl.
    CPC ......... *F27D 3/1509* (2013.01); *F27D 17/003* (2013.01); *C01P 2006/80* (2013.01); *C22B 9/20* (2013.01)

(56) References Cited

FOREIGN PATENT DOCUMENTS

| CN | 202090008 U    | 12/2011 |
| CN | 102445086 A    | 5/2012  |
| CN | 204211762 U    | 3/2015  |
| FR | 2254768 A1     | 7/1975  |
| RU | 2272976 C2     | 3/2006  |
| RU | 2375104 C2     | 12/2009 |
| RU | 2541264 C1     | 2/2015  |
| WO | 2013186664 A1  | 12/2013 |

OTHER PUBLICATIONS

Brazilian Search Report cited in related Brazilian application No. BR 112020003606-4, dated Jul. 5, 2022.

\* cited by examiner

HOOD FOR SI-METAL TAPPING

CROSS REFERENCE TO RELATED APPLICATIONS

This application is the U.S. National Phase of PCT Appln. No. PCT/EP2018/054384 filed Feb. 22, 2018, the disclosure of which is incorporated in their entirety by reference herein.

BACKGROUND OF THE INVENTION

1. Field of the Invention

The present invention provides a hood for a taphole and the tapping spout in a submerged arc furnace in the production of silicon and a process for the production of silicon.

2. Description of the Related Art

During the production of metallurgical-grade silicon, the molten metal exits the furnace through a borehole at the bottom of the crucible (taphole) during a process called "tapping". The liquid silicon flows onto a runner called "tapping spout" and into a container called a "ladle". Gaseous fumes from the furnace hearth, mostly consisting of SiO and CO, also exits through the taphole together with the liquid silicon. At the same time, air and/or oxygen is blown through the bottom of the ladle and rises through the molten silicon. This process, called "refining", also produces a gaseous fume containing SiO. These two streams of waste gas react with the ambient air into microsilica particles, carbon dioxide and heat, thus creating a hot exhaust gas (called tapping and/or refining gas/fume) that is loaded with microsilica dust and needs to be ventilated away from the working environment. For this purpose a small hood (called a "doghouse") is placed above and around the taphole and the tapping spout. The doghouse is connected or adjacent to an exhaust duct and suction is provided by a dedicated ventilator. The efficiency of the suction depends greatly on the geometric design of the doghouse and the exhaust duct.

At the same time, some technical aspects pose limitations to the doghouse design. One such limitation is that the doghouse is mounted on the crucible that is in constant rotational motion and suction should be provided regardless of the current doghouse position. Another limitation is that different pieces of equipment (called "tapping equipment") need to access the taphole(s) of the crucible in order to drill them open, seal them etc. The doghouse must not come in the way of such equipment. A third limitation is that during tapping the ladle needs to be accessible from above in order to introduce certain additives to the molten metal. The doghouse may therefore not fully cover the top surface of the ladle, which could let a portion of the fume emitted by the ladle escape into the environment.

The current state-of-the-art doghouse designs do not manage to provide sufficient suction, thus letting a significant amount of the tapping gas escape into the working environment.

An example of a state-of-the-art doghouse design is known from Mehdi Kadkhodabeigi: Modeling of Tapping Processes in Submerged Arc Furnaces, Thesis for the degree of Philosophiae Doctor, May 2011, Norwegian University, Trondheim; p. 108-142.

The state-of-the-art doghouse designs include a single suction duct, which can either be located opposite the doghouse, or on the side of the doghouse. If the suction duct is placed at a fixed location opposite the doghouse, the suction will only be sufficient if the doghouse and the suction duct are aligned. However, due to the constant rotational motion of the crucible there will often be a misalignment of the doghouse and the suction duct. This will lead to a ventilation of mostly ambient air instead of the tapping fume, which will be able to escape into the working environment. It is therefore advantageous to place the suction duct on the doghouse in which case the suction system needs to rotate together with the doghouse and the crucible. Even in this design, using a single duct is inadequate for ventilating both the fume emitted by the taphole and the fume coming from the ladle due to the distance between them. If the suction duct is placed over the ladle then the fume from the taphole can escape. If the suction duct is placed close to the taphole then the fume from the ladle will not be ventilated. In addition, usually doghouses are built using panels that are either horizontal or vertical, thus creating stagnant volume regions in which the tapping gas can accumulate and escape.

SUMMARY OF THE INVENTION

The present invention provides a hood (1) for a taphole (4) and a tapping spout (2) in a submerged arc furnace in the production of silicon wherein the hood (1) has at least two suction ducts (3) which are placed on either side of the hood (1). The present invention further provides a process for the production of silicon in a submerged arc furnace, wherein liquid silicon and refining gas escape from a taphole (4) of a crucible (7), wherein the liquid silicon flows on a tapping spout (2) into a ladle (5), wherein the refining gas is sucked in a hood (1) which has at least two suction ducts (3) which are placed on either side of the hood (1).

DETAILED DESCRIPTION OF THE PREFERRED EMBODIMENTS

Figure 1:
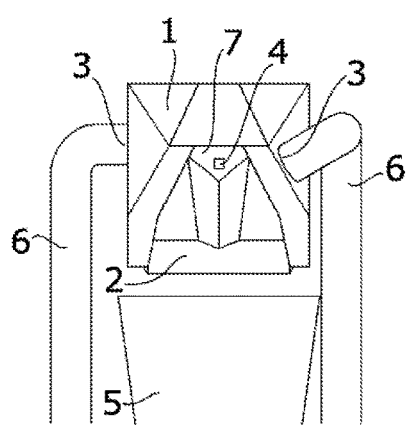
FIG. 1 is a front view of one embodiment of the invention.

The hood according to the invention uses at least two suction ducts (3) instead of the usual single suction duct (3) and therefore provides improved suction of the gas emitted from the taphole (4) when compared to the conventional designs while it manages to comply with the aforementioned restrictions.

If the ducts (3) are located on the same side of the hood (1), then the suction will not be uniform and the gas may escape on the other side of the hood (1).

Preferably, the hood (1) features a suction system that rotates together with the hood (1) and the crucible (7).

Preferably, the hood (1) has two suction ducts (3) which are placed asymmetrically on either side of the hood (1).

The asymmetrical position avoids that the gas flow can have a stagnation point halfway between the two ducts (3) and that the suction can be inadequate.

However, if the ducts (3) are placed asymmetrically opposite each other, then no stagnation point will appear, thus improving the suction.

Preferably, one suction duct (3) is placed close to the taphole (4), thus ventilating the gas emitted from the crucible (7) and the other suction duct (3) is placed over the ladle (5) into which the liquid silicon flows for capturing the fume emitted by the refining process.

Preferably, the refining gas or the tapping gas is sucked by pipes (6) which are connected with the suction ducts (3).

Preferably, both suction pipes (6) are oriented vertically immediately after their connection point to the hood (1). This causes the gas to flow downwards as soon as it enters the duct (3). In this way the microsilica particles contained in the gas cannot sediment and stick on the inner walls of the pipes (6) and clogging risk of the ducts (3) is thus reduced.

In a preferred embodiment, the pipes (6) have manhole openings which facilitate cleaning of the hood (1) and the pipes (6).

In a preferred embodiment, in order to further minimize the amount of smoke that may escape, the hood (1) walls are sloped whenever possible instead of being horizontal or vertical. This minimizes the hood inner volume and eliminates stagnant volume regions in which suction is poor and smoke can accumulate. Preferably the side walls of the hood (1) are sloped.

The hood decreases the amount of flue gas that manages to escape the ventilation system and enter the working environment. This results into better working conditions for the people operating the tapping equipment by improving the air quality and by reducing the dust accumulation in the tapping area.

In a preferred embodiment, the hood material is steel.

Figure 2:
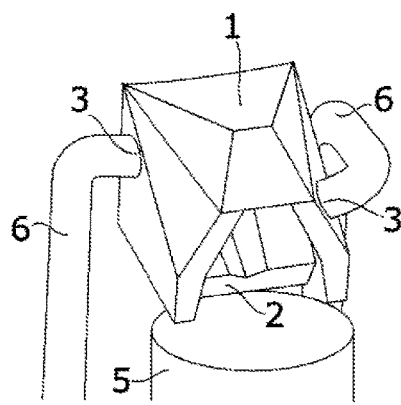
FIG. 2 is a perspective view of the embodiment of FIG. 1
Figure 3:
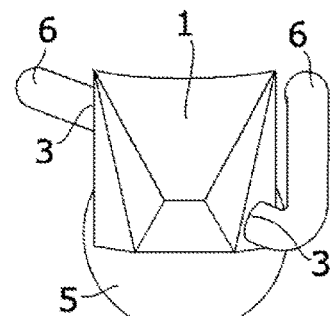
FIG. 3 is a top view of the embodiment of FIG. 1.

FIGS. 1 to 3 show the hood (1) according to the invention placed above the ladle (5) from different views. FIG. 1 is a front view, FIG. 2 is a perspective view and FIG. 3 is a top view.

FIGS. 1 to 3 show the hood (1) which covers the tapping spout (2) where liquid silicon is flowing into the ladle (5). Two suction ducts (3) are used for capturing the tapping and the refining gas from the taphole (4) and the tapping spout (2) which are connected with the crucible (7). The gas is sucked by pipes (6) which are connected with the suction ducts (3).

In addition the two ducts (3) are located on opposite sides of the hood (1) in an asymmetric manner. The two pipes (6) are oriented vertically after their connection point to the hood (1). The hood (1) has sloped surfaces.

The invention claimed is:

1. A process for the production of silicon in a submerged arc furnace, wherein liquid silicon and refining gas escape from a taphole of a crucible, wherein the liquid silicon flows on a tapping spout into a ladle, wherein the refining gas is suctioned off in a taphole hood attached to the furnace close to the taphole, the taphole hood having at least two suction ducts which are placed asymmetrically on either side of the hood.

2. The process of claim 1, wherein one suction duct is placed close to the taphole, thus ventilating gas emitted from the crucible, and the other suction duct is placed over the ladle into which the liquid silicon flows, for capturing fume emitted by the refining process.

3. The process of claim 1, wherein the refining or the tapping gas is suctioned off by pipes which are connected with the suction ducts, the pipes being oriented vertically immediately after their connection point on either side of the taphole hood.

4. The process of claim 1, wherein the ducts have manhole openings.

5. The process of claim 1, wherein the taphole hood walls are sloped.

6. The process of claim 3, wherein the pipes extend vertically downwards.

7. The process of claim 1, wherein the taphole hood is connected to a suction system which rotates together with the taphole hood and the crucible.

8. The process of claim 1, wherein the taphole hood is connected to a dedicated suction system.

\* \* \* \* \*